(12) United States Patent
Campbell

(10) Patent No.: US 8,049,821 B2
(45) Date of Patent: Nov. 1, 2011

(54) VIDEO BUFFER MANAGEMENT

(75) Inventor: Robert Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1284 days.

(21) Appl. No.: 11/710,825

(22) Filed: Feb. 26, 2007

(65) Prior Publication Data

US 2008/0204604 A1    Aug. 28, 2008

(51) Int. Cl.
*H04N 5/50* (2006.01)
*H04N 5/44* (2011.01)

(52) U.S. Cl. ........ 348/731; 348/725; 348/553; 348/715; 348/567

(58) Field of Classification Search ............... 348/731, 348/565, 567, 705, 714, 715, 568, 725, 732, 348/553; 725/38
See application file for complete search history.

(56) References Cited

U.S. PATENT DOCUMENTS

| 5,729,300 | A  | * | 3/1998 | Ahn ............................ 348/564 |
| 5,801,786 | A  | * | 9/1998 | Song ........................... 348/564 |
| 6,115,080 | A  | * | 9/2000 | Reitmeier .................... 348/731 |
| 6,335,728 | B1 | * | 1/2002 | Kida et al. ................... 345/204 |
| 6,680,754 | B1 | * | 1/2004 | Yim ............................. 348/565 |

FOREIGN PATENT DOCUMENTS

| WO | WO-2007/011356 |   | 1/2007 |
| WO | WO 2007/011356 | * | 1/2007 |

* cited by examiner

*Primary Examiner* — Jefferey Harold
*Assistant Examiner* — Jean W Desir

(57) ABSTRACT

In one embodiment a video system comprises a first tuner, a first memory buffer coupled to the first tuner to receive a first video signal from the first tuner, a second tuner, a second memory buffer coupled to the second tuner to receive a second video signal from the second tuner, and a controller comprising logic to direct the first video signal from the first memory buffer to an output port, receive a signal to switch the output port from the first memory buffer to the second memory buffer, and in response to the signal, couple the output port to the second memory buffer without disrupting the operations of the first memory buffer.

19 Claims, 3 Drawing Sheets

VIDEO BUFFER MANAGEMENT

BACKGROUND

Video entertainment devices such as televisions, computers, digital video recorders, and the like may be provided with multiple tuners to enable reception of multiple signals or channels. Signals output from tuners are stored in a memory buffer and may be presented on a display device such as, e.g., a television or computer monitor, or may be recorded on a memory device such as, e.g., a hard disk drive. Switching between tuners causes the memory buffer to be flushed, which may cause a user to lose content from the video signal.

DETAILED DESCRIPTION

Figure 1:
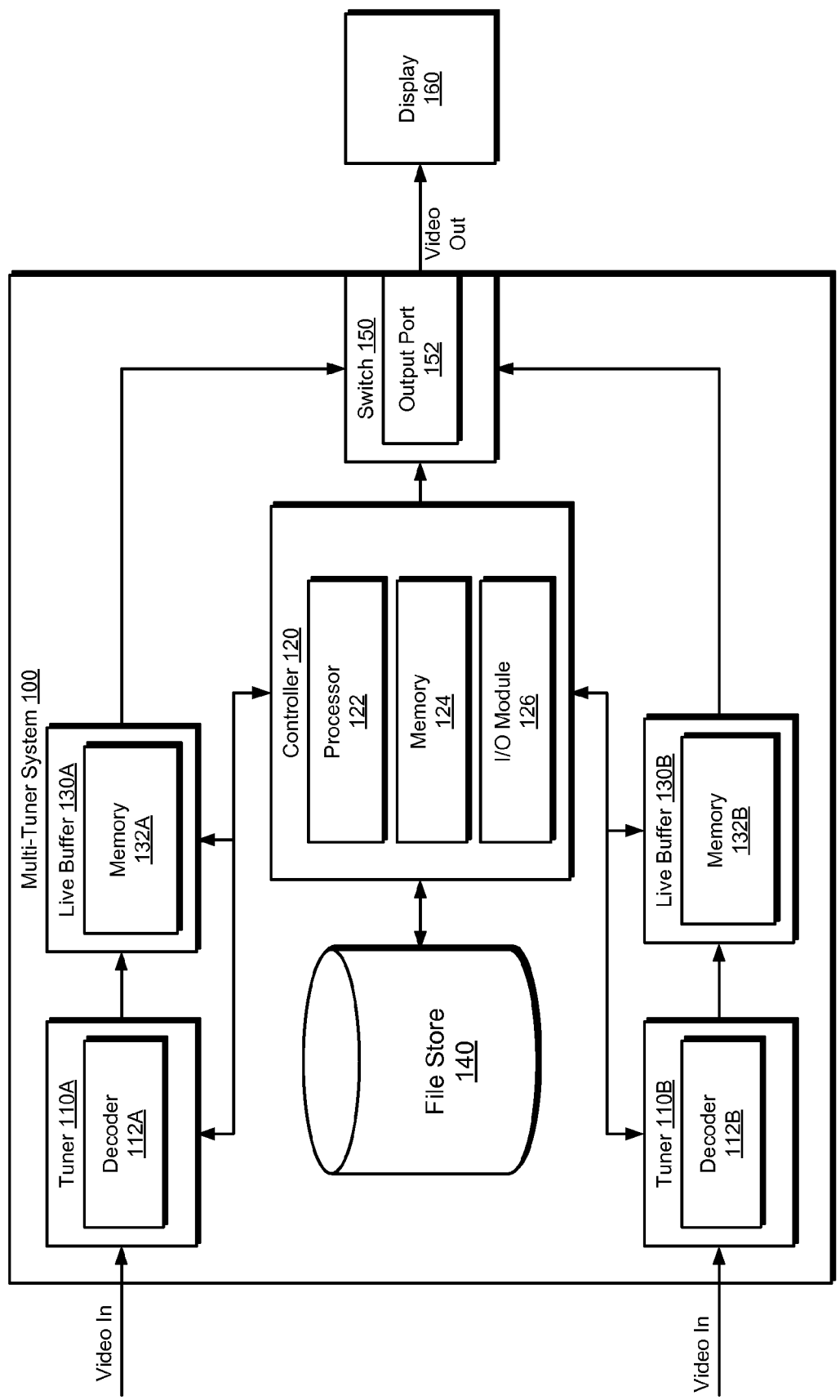
FIG. 1 is a schematic illustration of a multi-tuner video system in accordance with some embodiments.

FIG. 1 is a schematic illustration of a multi-tuner video system 100 in accordance with some embodiments. The system 100 includes a first tuner 110A coupled to a first live buffer 130A, a second tuner 110B coupled to a second live buffer 130B, a controller 120, file store 140, a switch 150, and an output port 152. A display device 160 may be coupled to the output port 152. Display device may be embodied as, e.g., a television, a cathode ray tube (CRT), a liquid crystal display (LCD) computer screen, or any other suitable display device. By way of illustration only, and not limitation, the system 100 will be described with reference to a multi-media personal computer system. However, it will be recognized by one of ordinary skill in the art that the disclosed invention may be employed as part of a personal video recorder (PVR), television, handheld Internet appliance or any other suitable device or system employing a display device.

The tuners 110A and 110B may be embodied as any suitable tuners that may receive digital or analog video and audio information for display on display 160. In embodiments in which the first and second tuners 110A, 110B are television tuners, they may include decoders 112A, 112B to perform analog to digital conversion, digital to analog conversion, or both.

First tuner 110A is operatively coupled to receive an incoming video signal, such as incoming video information from a television signal source in digital or analog form. If the incoming signal is digital information, then decoder 112A decompresses the information and/or performs format conversion if necessary. The first tuner 110A is operatively coupled to receive incoming signals for a first channel. As used herein, the term "channel" may include any suitable frequency or code or any other suitable delineation used to distinguish among channels containing differing video information. The second tuner 110B is also operatively coupled to receive an incoming signal and may be tuned to a second channel. In some embodiments, controller 120 may set the channel(s) to which tuners 110A and 110B are set via channel control data input to the controller 120.

Live buffer 130A is coupled to tuner 110A to store video received in tuner 110A for controlled playback. Buffer 130A includes a memory module 132A that may store, for example, a playback file. Similarly, live buffer 130B is coupled to tuner 110B to store video received in tuner 110B for controlled playback. Buffer 130B includes a memory module 132B that may store, for example, a playback file.

System 100 further includes a switch 150, which is controlled by the controller 120 via a control signal to switch, for example, the output of one of buffer 130A or buffer 130B to output port 152. Output port 152 may be integrated within switch 150 our may be separate from, switch 150.

Controller 120 includes a processor 122, a memory module 124, and an input/output (I/O) module 126. In some embodiments, controller 120 may capture quality setting information, for example, a setting indicating that the decoder should capture the video at a specific resolution. The controller 120 may be, for example, one or more suitably programmed microprocessors, DSPs, discrete logic, state machines or any other suitable hardware, software, or suitable combination thereof to perform various operations described herein.

Figure 2:
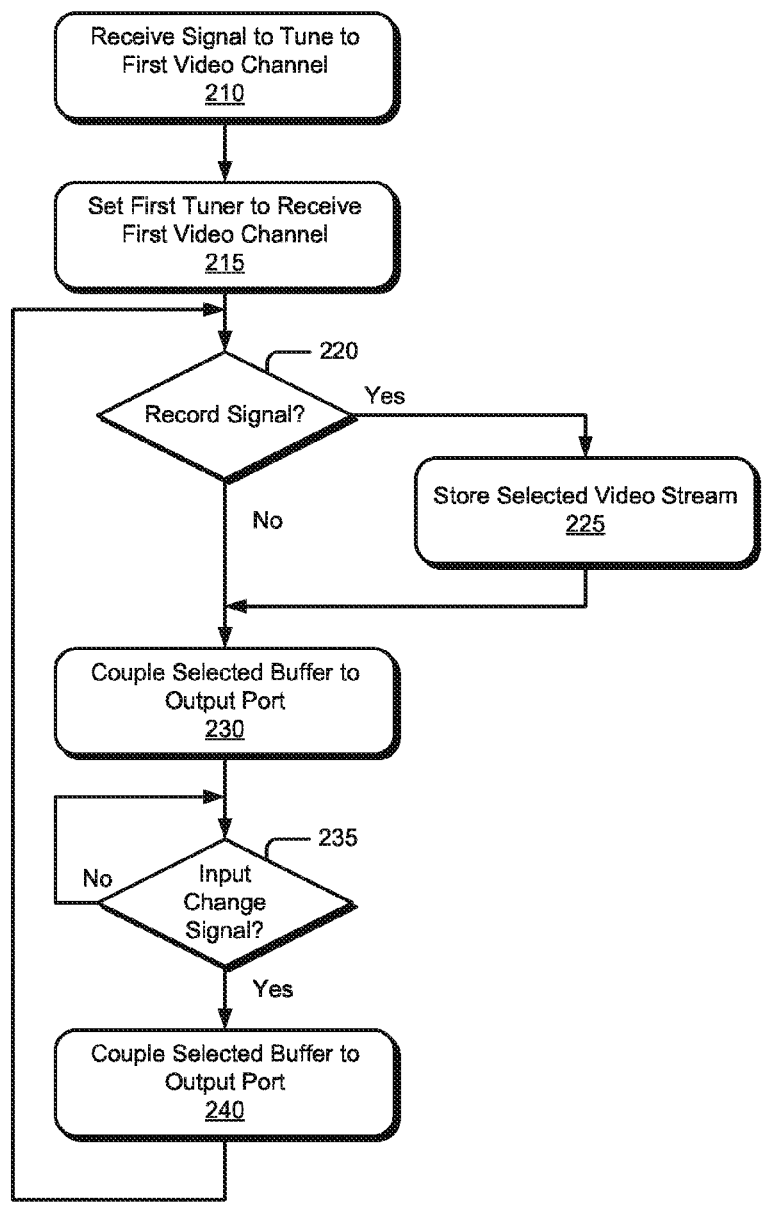
FIG. 2 is a flowchart illustrating operations of a method of video buffer management in accordance with some embodiments.

FIG. 2 is a flowchart illustrating operations of a method of video buffer management in accordance with some embodiments. In some embodiments the operations depicted in FIG. 2 may be implemented by the controller 120. Referring to FIG. 2, at 210 the controller receives a signal to tune the first tuner 110A to a first channel. For example, controller 120 may receive a signal from a user of the system 100 via a user interface such as, e.g., an interface on display 120 or from a remote control device. The video signal received in the first tuner 110A is decoded by decoder 112A and passed to the memory module 132A of live buffer 130A. At 215 the controller 120 sets the first tuner 110A to receive the video channel identified in the signal.

The controller 120 monitors for receipt of a record signal. If the controller 120 receives a record signal (operation 220), then the selected video signal is stored in the file store 140 (operation 225). For example, controller 120 may store the first video signal in a playback file in file store 140. The selected (i.e., first) buffer 130A is then coupled to the output port 152 (operation 230). For example, controller 120 may direct switch 150 to couple buffer 130A to output port 152. In some embodiments, a display 160 may be coupled to output port 152, such that the first video signal is presented on display 160.

The controller 120 then monitors for receipt of an input change signal, which directs the controller to switch the output port from the selected (i.e., first) memory buffer 130A to a different (i.e., second) memory buffer 130B. If the controller 120 receives an input change signal (operation 235), then the second buffer 110B is then coupled to the output port 152 (operation 240). For example, controller 120 may direct switch 150 to couple buffer 130B to output port 152, such that the second video signal is presented on display 160.

In some embodiments, switching the input to output port 152 has no effect on buffer operations of the system 100. Thus, switching the input to output port 152 from first buffer 130A to second buffer 130B disrupts neither the feed of the video signal from first tuner 110A to first buffer 130A nor the contents of first buffer 130A. Thus, the contents of first buffer 130A remain available for playback operations, pause operations, or the like. Further, switching the input to output port 152 from first buffer 130A to second buffer 130B does not disrupt recording operations being executed on the first video signal.

Operations 220-240 may be repeated to enable a user to switch between channels directed to display 160 without affecting the content of the memory buffers 130, which are retained in memory for playback or pause operations, recording, and the like.

Figure 3:
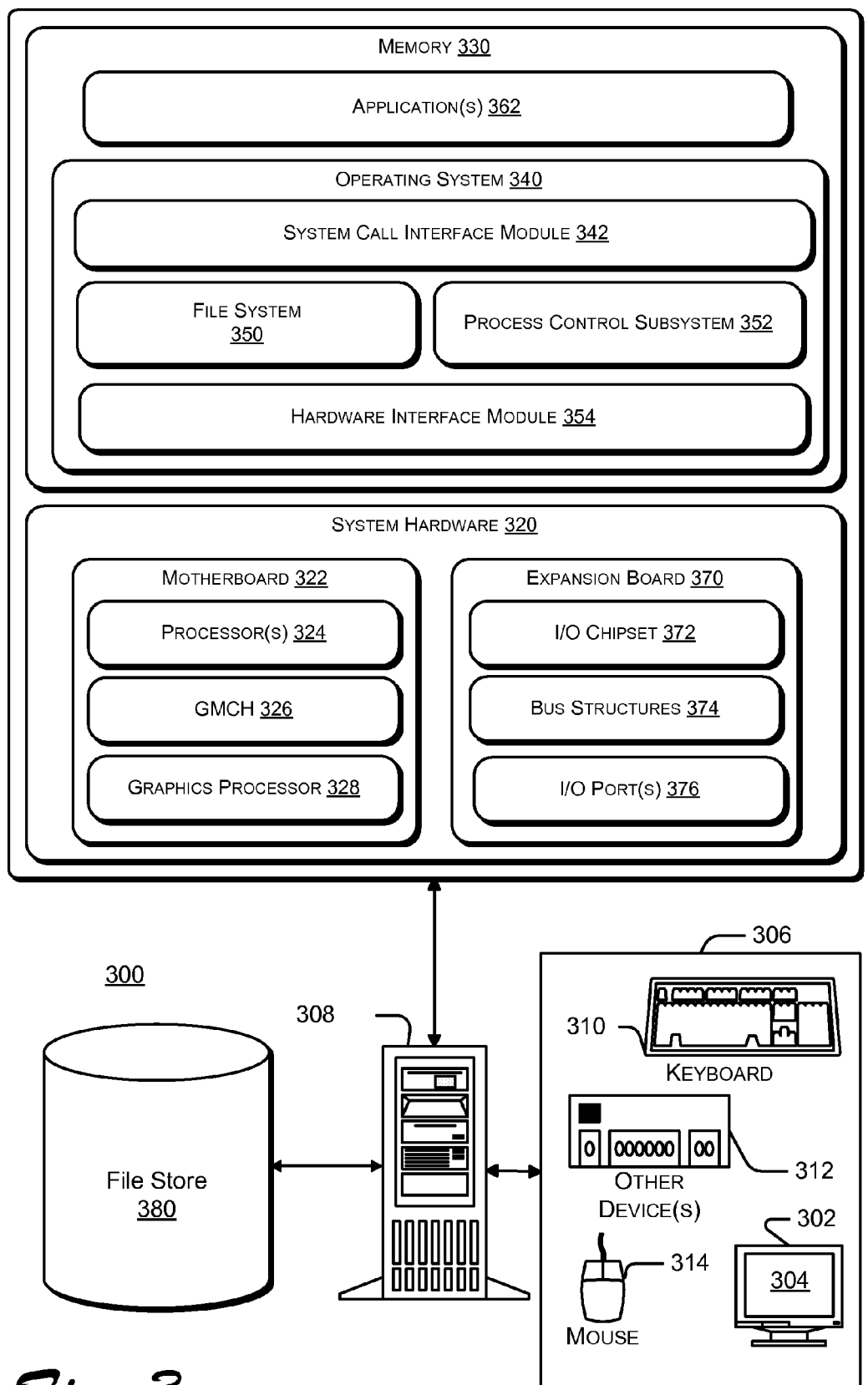
FIG. 3 is a schematic illustration of a computer system in accordance with some embodiments.

In some embodiments, system 100 may be implemented in a computer system. FIG. 3 is a schematic illustration of a computer system 300 which may be adapted to implement video buffer management as described herein. The computer system 300 may include a computer 308 and one or more accompanying input/output devices 306, e.g., a display 302 having a screen 304, a keyboard 310, and a mouse 314.

The computer 308 includes system hardware 320 including a processor 322 and random access memory and/or read-only memory 330. A file store 380 is communicatively connected to computer 308. File store 380 may be internal such as, e.g., one or more hard drives, or external such as, e.g., one or more external hard drives, network attached storage, or a separate storage network.

In some embodiments, system hardware 320 comprises a motherboard 322 and at least one expansion board 370. Motherboard 322 hosts a plurality of components comprising at least one processor 324, a graphics and memory control hub (GMCH) 326, and a graphics processor. Motherboard 322 further comprises sockets to receive the various components mounted on motherboard 322 and circuit traces to provide electrical connections between the components.

In some embodiments, expansion board 370 may be an input/output (I/O) board. Expansion board 370 may include an I/O chipset such as, for example, a PCI-Express (PCIE) chipset 372, and bus structures 374 and one or more I/O ports 376. In some embodiments expansion board may include components which provide different functionality.

Memory 330 comprises an operating system 340 for managing operations of computer 308. Operating system 340 comprises a hardware interface module 354 that provides an interface to system hardware 320. At least one or more file systems 350 to manage files used in the operation of computer 308, and a process control subsystem 352 that manages processes executing on computer 308. Operating system 340 further comprises a system call interface module 342 that provides an interface between the operating system 340 and one or more applications executing on the computer system.

In operation, applications 362 executing on computer 308 make calls to the system call interface module 342 to execute one or more commands on the computer's processor. The system call interface module 342 invokes the services of the file systems 350 to manage the files required by the command(s) and the process control subsystem 352 to manage the process required by the command(s). The file system 350 and the process control subsystem 352, in turn, invoke the services of the hardware interface module 354 to interface with the system hardware 320.

Thus, described herein are exemplary systems and methods for video buffer management. The methods described herein may be embodied as logic instructions on a computer-readable medium. When executed on a processor, the logic instructions cause a general purpose computing device to be programmed as a special-purpose machine that implements the described methods. The processor, when configured by the logic instructions to execute the methods recited herein, constitutes structure for performing the described methods.

Moreover, some embodiments may be provided as computer program products, which may include a machine-readable or computer-readable medium having stored thereon instructions used to program a computer (or other electronic devices) to perform a process discussed herein. The machine-readable medium may include, but is not limited to, floppy diskettes, hard disks, optical disks, CD-ROMs, and magneto-optical disks, ROMs, RAMs, erasable programmable ROMs (EPROMs), electrically EPROMs (EEPROMs), magnetic or optical cards, flash memory, or other suitable types of media or computer-readable media suitable for storing electronic instructions and/or data. Moreover, data discussed herein may be stored in a single database, multiple databases, or otherwise in select forms (such as in a table).

Additionally, some embodiments discussed herein may be downloaded as a computer program product, wherein the program may be transferred from a remote computer (e.g., a server) to a requesting computer (e.g., a client) by way of data signals embodied in a carrier wave or other propagation medium via a communication link (e.g., a modem or network connection). Accordingly, herein, a carrier wave shall be regarded as comprising a machine-readable medium.

Reference in the specification to "one embodiment" or "an embodiment" means that a particular feature, structure, or characteristic described in connection with the embodiment is included in at least an implementation. The appearances of the phrase "in one embodiment" in various places in the specification are not necessarily all referring to the same embodiment.

What is claimed is:

1. A method to manage video buffer content in a multi-tuner video system, comprising:
   storing a first video signal from a first tuner in a first memory buffer;
   directing the first video signal to an output port;
   storing a second video signal from a second tuner in a second memory buffer;
   receiving a signal to switch the output port from the first memory buffer to the second memory buffer;
   in response to the signal, coupling the output port to the second memory buffer without disrupting the operations of the first memory buffer;
   receiving a second signal to replay a portion of the video signal content stored in the first memory buffer; and
   in response to the second signal, coupling a display input to the first memory buffer without disrupting the operations of the second memory buffer.

2. The method of claim 1, wherein storing a first video signal from a first tuner in a first memory buffer comprises:
   receiving a first video signal in the first tuner; and
   decoding the first video signal.

3. The method of claim 1, wherein storing a second video signal from a first tuner in a second memory buffer comprises:
   receiving a second video signal in the second tuner; and
   decoding the second video signal.

4. The method of claim 1, further comprising storing at least one of the first video signal or the second video signal in a file store.

5. The method of claim 4, further comprising:
   receiving a third signal to replay the one of the first video signal or the second video signal in the file store; and
   in response to the third signal, coupling the display input to the file store without disrupting the operations of the first memory buffer and the second memory buffer.

6. The method of claim 1, further comprising storing the first video signal in a file store in response to receiving a third signal and storing the second video signal in the file store in response to receiving a fourth signal.

7. A video system, comprising:
   a first tuner;
   a first memory buffer coupled to the first tuner to receive a first video signal from the first tuner;
   a second tuner;
   a second memory buffer coupled to the second tuner to receive a second video signal from the second tuner;
   a controller comprising logic to:

direct the first video signal from the first memory buffer to an output port;

receive a signal to switch the output port from the first memory buffer to the second memory buffer;

in response to the signal, couple the output port to the second memory buffer without disrupting the operations of the first memory buffer;

receive a second signal to replay a portion of the video signal content stored in the first memory buffer; and in response to the second signal, couple the output port to the first memory buffer without disrupting the operations of the second memory buffer.

8. The video system of claim 7, further comprising logic to:
receive a first video signal in the first tuner; and
decode the first video signal.

9. The video system of claim 7, further comprising logic to:
receive a second video signal in the second tuner; and
decode the second video signal.

10. The video system of claim 7, further comprising logic to store at least one of the first video signal or the second video signal in a file store.

11. The video system of claim 7, further, further comprising a display coupled to the output port.

12. The video system of claim 10, further comprising logic to:
receive a third signal to replay the one of the first video signal or the second video signal in the file store; and
in response to the third signal, coupling the display input to the file store without disrupting the operations of the first memory buffer and the second memory buffer.

13. The video system of claim 7, further comprising logic to store the first video signal in a file store in response to receiving a third signal and store the second video signal in the file store in response to receiving a fourth signal.

14. A computer program product comprising logic instructions stored on a non-transitory computer-readable medium which, when executed by a computer processor, configure the processor to:
store a first video signal from a first tuner in a first memory buffer;
direct the first video signal to an output port;
store a second video signal from a second tuner in a second memory buffer;

receive a signal to switch the output port from the first memory buffer to the second memory buffer;

in response to the signal, couple the output port to the second memory buffer without disrupting the operations of the first memory buffer;

receive a second signal to replay a portion of the video signal content stored in the first memory buffer; and in response to the second signal, couple a display input to the first memory buffer without disrupting the operations of the second memory buffer.

15. The computer program product of claim 14, further comprising logic instructions stored on a non-transitory computer-readable medium which, when executed by a computer processor, configure the processor to:
receive a first video signal in the first tuner; and
decode the first video signal.

16. The computer program product of claim 14, further comprising logic instructions stored on a non-transitory computer-readable medium which, when executed by a computer processor, configure the processor to:
receive a second video signal in the second tuner; and
decode the second video signal.

17. The computer program product of claim 14, further comprising logic instructions stored on a non-transitory computer-readable medium which, when executed by a computer processor, configure the processor to store at least one of the first video signal or the second video signal in a file store.

18. The computer program product of claim 17, further comprising logic instructions stored on a non-transitory computer-readable medium which, when executed by a computer processor, configure the processor to:
receive a third signal to replay the one of the first video signal or the second video signal in the file store; and
in response to the third signal, coupling the display input to the file store without disrupting the operations of the first memory buffer and the second memory buffer.

19. The computer program product of claim 14, further comprising logic instructions stored on a non-transitory computer-readable medium which, when executed by a computer processor, configure the processor to store the first video signal in a file store in response to receiving a third signal and store the second video signal in the file store in response to receiving a fourth signal.

* * * * *

UNITED STATES PATENT AND TRADEMARK OFFICE
CERTIFICATE OF CORRECTION

PATENT NO.       : 8,049,821 B2                                          Page 1 of 1
APPLICATION NO.  : 11/710825
DATED            : November 1, 2011
INVENTOR(S)      : Robert Campbell It is certified that error appears in the above-identified patent and that said Letters Patent is hereby corrected as shown below:

In column 5, line 23, in Claim 11, before "further" delete "further,".

Signed and Sealed this
Fourth Day of September, 2012

David J. Kappos
*Director of the United States Patent and Trademark Office*